Aug. 18, 1931. K. A. MAYR ET AL 1,819,615
BALANCED VALVE
Filed Feb. 3, 1927 2 Sheets-Sheet 1
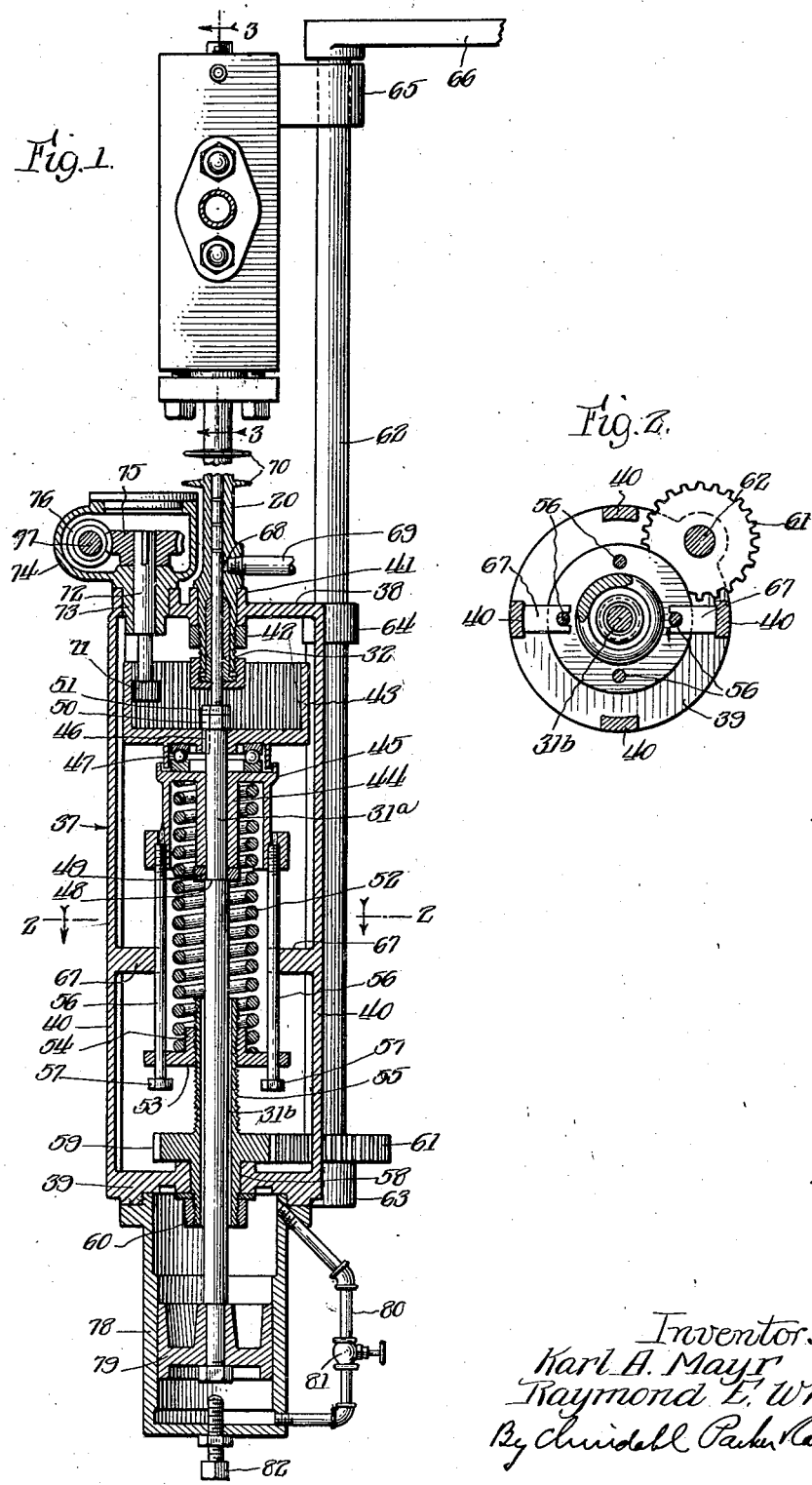
Inventors:
Karl A. Mayr
Raymond E. White,
By Crindell Parker Carlson
Attys.

Aug. 18, 1931.  K. A. MAYR ET AL  1,819,615
BALANCED VALVE
Filed Feb. 3, 1927  2 Sheets-Sheet 2
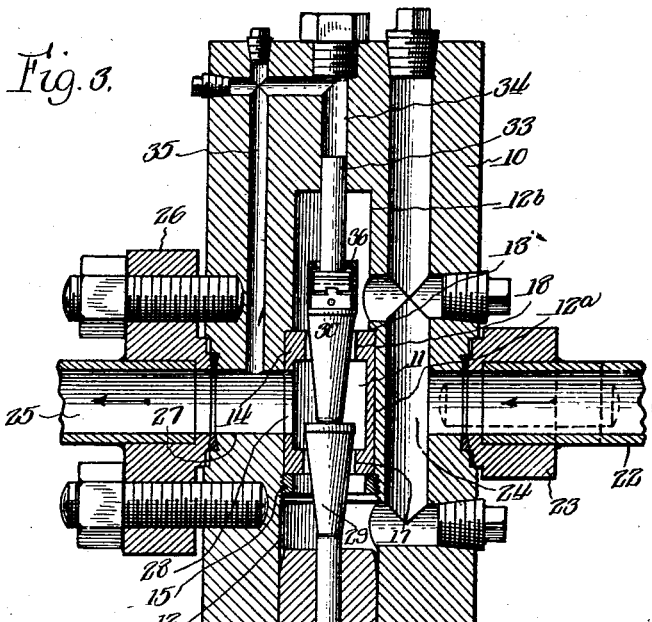
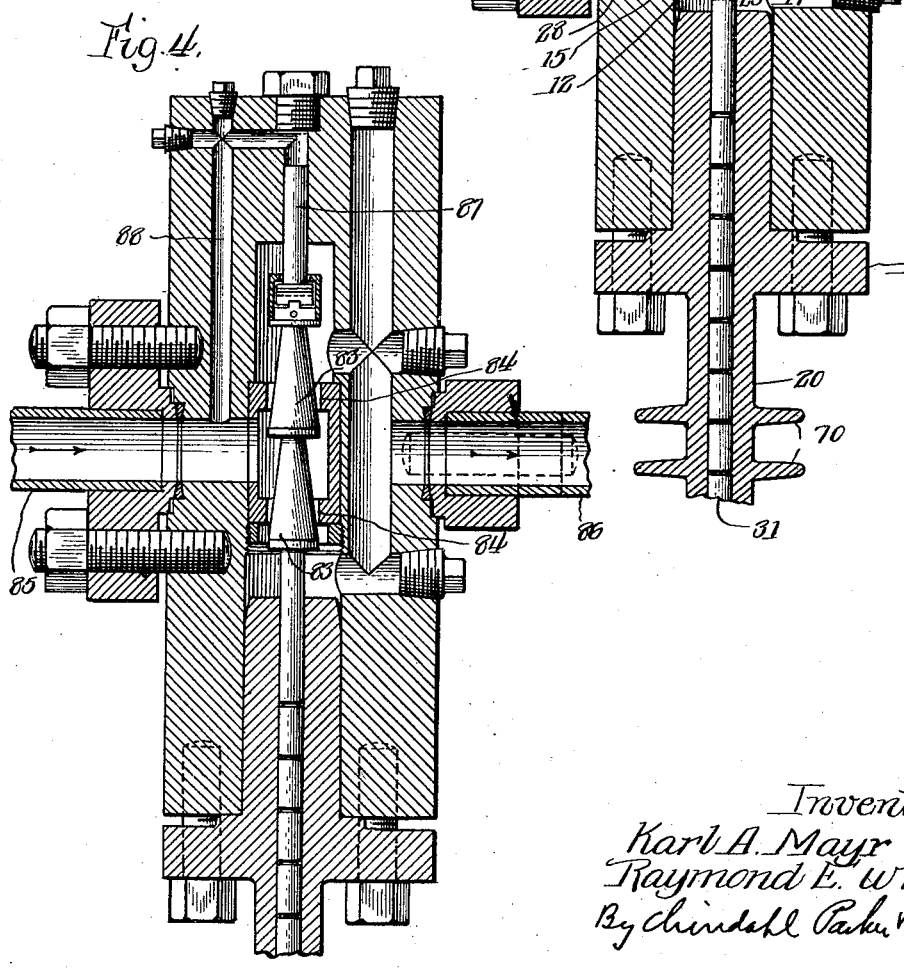
Inventors:
Karl A. Mayr
Raymond E. White,
By Chindahl Parker Carlson
Attys.

Patented Aug. 18, 1931

1,819,615

UNITED STATES PATENT OFFICE

KARL A. MAYR AND RAYMOND E. WHITE, OF CHICAGO, ILLINOIS; SAID WHITE ASSIGNOR, BY MESNE ASSIGNMENTS, TO THE G. W. DULANY TRUST, OF CHICAGO, ILLINOIS, A COMMON-LAW TRUST

BALANCED VALVE

Application filed February 3, 1927. Serial No. 165,569.

Among the objects of the present invention are the provision of novel means whereby the action of the valve is not affected by and is independent of the back pressure, novel means for reducing to a negligible amount the friction on the moving parts controlling the passage area of the valve, novel means for obviating the necessity of employing excessive pressure in the packing box, and novel means for preventing vibrations caused by external factors from materially influencing the action of the value.

In the accompanying drawings, Figure 1 is a vertical sectional view of a valve embodying the features of our invention.

Fig. 2 is a sectional view taken along line 2—2 of Fig. 1.

Fig. 3 is a sectional view of a reducing valve embodying the features of our invention, the view being taken in the plane indicated by dotted line 3—3 of Fig. 1.

Fig. 4 is a similar view, but showing the invention embodied in an overflow or relief valve.

While we have shown in the drawings and will herein describe in detail the construction which we prefer, it is to be understood that we do not thereby intend to limit the invention to the specific forms disclosed, but intend to cover all modifications and alternative constructions falling within the spirit and scope of the invention as expressed in the appended claims.

Referring first to the embodiment shown in Fig. 3, the valve comprises a valve casing 10 which may have any suitable form, but which preferably is a rectangular block having a valve chamber 11. In the present instance, the chamber 11 is provided by a longitudinal bore opening at the lower end of the casing 10, and comprising the portions 12, 12$^a$ and 12$^b$. The portion 12$^b$ is smaller in diameter than the portion 12$^a$, and thus defines an annular shoulder 13 at the junction. The portion 12$^a$ is slightly smaller in diameter than the portion 12.

A cylindrical valve sleeve 14 is fitted snugly into the bore 12$^a$ and against the shoulder 13, and is held in position by an annular screw plug 15. The ends of the sleeve 14 are formed with inner radial flanges defining valve ports 17 and 18 opening, respectively, from the interior of said sleeve into the bore-portions or chambers 12 and 12$^b$. This construction permits ease of assembly and disassembly.

The lower end of the casing 10 is secured to a flange 19 on the upper end of a tubular guide member 20.

A fluid supply pipe 22 connected to a source of fluid under pressure is rigidly secured to the casing 10 by a gland 23, and communicates with a passage 24 leading to the chambers 12 and 12$^b$. An outlet pipe 25 is secured to the casing 10 by a gland 26, and communicates with a passage 27 leading to an outlet port 28 in the valve sleeve 14.

The flow of fluid under pressure into the sleeve 14 through the ports 17 and 18 is controlled by conical valve members 29 and 30. These valve members are formed on a valve stem 31 which extends slidably and rotatably through the guide 20 and through a packing box 32 at the lower end of the guide 20. A piston 33 is connected to the upper end of the pair of valve members, said piston being slidable in a bore 34 in the casing 10 constituting a cylinder. The cylinder 34 communicates with the outlet passage 27 through a duct 35. In order to prevent binding or excessive friction in case the parts should warp by reason of heat, the piston 33 is connected to the valve members 29 and 30 by means of a universal coupling 36. It will be evident that the effective passage through the ports 17 and 18 can be varied by moving the stem 31 longitudinally. To insure freedom of movement independent of back pressure, the valve stem 31 and the piston 33 are of equal diameter at opposite ends of the pair of valve members 29 and 30.

The pressure in the outlet passage 27 is automatically maintained at a predetermined point irrespective of the volume of flow and of fluctuations in the inlet pressure by balancing the outlet pressure through the piston 33 and the valve stem 31 against a definite load. The means for applying such load will now be described.

The guide 20 is rigidly mounted on a support 37 which may be of any desired construction, but which in the present instance comprises an integral casting formed with an upper bracket plate 38, a lower bracket plate 39, and a plurality of peripherally spaced connecting members 40. The lower end of the guide 20 is clamped in a sleeve 41 formed centrally in the plate 38 by means of a clamp nut 42.

The valve stem 31 is formed below the packing box 32 with an enlarged section 31$^a$ extending centrally through a cup shaped internal gear 43 opening upwardly, and through a central bearing 44 formed in a cylindrical spring seat 45 opening downwardly. The valve stem and the gear 43 are connected to rotate together by means of a key 46. A ball bearing 47 is interposed between the gear 43 and the seat 45.

The valve stem 31 is formed below the bearing 44 with an enlarged section 31$^b$ defining an upwardly facing annular shoulder 48. A bearing ring 49 is interposed between the end of the bearing 44 and the shoulder 48. The gear 43, the ball bearing 47, the spring seat 45 and the ring 49 are held between the shoulder 48 and a nut 50 turned on the valve stem within the gear 43. The nut 50 is adjusted so that there is sufficient clearance between the bearing sleeve 44 and the bearing ring 49 to permit the valve stem to rotate freely within the bearing sleeve 44. 51 is a lock nut.

The load is applied by means of a coiled spring 52, the upper end of which rests against the inside of the spring seat 45, and the lower end of which bears against a lower spring seat 53. The latter is formed with an axial sleeve 54 which is threaded onto a tubular supporting stud 55. A plurality of rods 56 are secured to the upper spring seat 45 and extend freely through openings in the lower spring seat 53. On the lower ends of said rods are heads 57.

The load, i. e. the pressure of the spring 52, against which the inlet pressure in the valve is balanced may be adjusted by adjusting the stud 55 to raise or lower the spring seat 53. To this end, the lower end of the stud 55 is journaled in a bearing 58 formed centrally in the lower bracket plate 39, and is rigid with a spur gear 59 resting on the upper end of the bearing. The stud 55 is held against endwise movement by a nut 60 thereon engaging the lower end of the bearing 58. The gear 59 meshes with a gear 61 on a vertical adjusting shaft 62 which is journaled in bearings 63 and 64 on the support 37 and a bearing 65 on the valve casing 10, and which is provided at its upper end with an adjusting handle 66. The spring seats 45 and 53 are held against rotation when the spring is adjusted, by means of notched projections 67 on two diametrically opposite frame members 40, said projections engaging two of the rods 56.

It will be evident that changes in the pressure in the outlet passage 27 will be transmitted through the passage 35 to the piston 33, and will cause longitudinal movement of the valve members to compensate for such changes. If the pressure increases, the valve members will be lowered against the force of the spring 52, thereby diminishing the effective openings through the valve ports 17 and 18 to decrease the flow of fluid. If the pressure in the passage 27 falls, the spring 52 will raise the valve members to increase the flow. As a result, for a given spring load, a predetermined pressure in the outlet passage 27 will be automatically maintained. This equilibrium pressure may be varied by adjusting the pressure of the spring. Due to the uniform diameter of the valve stem and the piston below and above the valve members there will be no unequal back pressure tending to influence the compensating movements of the stem.

No substantial amount of pressure fluid should escape from the valve casing 10 along the stem 31. If a packing box were alone relied upon to prevent leakage, the pressure of the packing against the stem 31 that would be required to prevent leakage of fluid under a high pressure would cause excessive friction, thereby materially impairing the sensitiveness of the mechanism.

To obviate such construction the guide 20 is made of considerable length, and the stem 31 is formed with a plurality of closely spaced annular grooves 67 adapted to collect condensate which will tend to seal the space along the stem. As a result, there is a substantial pressure drop from the casing 10 to the lower end of the guide 20. To prevent any fluid that may pass through the guide 20 from reaching the packing box 32 under a relatively high pressure, and to collect such fluid, a bleed vent 68 is formed in the lower end of the guide. This vent 68 opens into a relatively low pressure line 69 so that the pressure drop from the vent to the packing box 35 is low, thus making possible the use of relatively low pressure in the packing box.

To protect the stem-adjusting mechanism from excessive heat, a plurality of cooling flanges or ribs 70 are provided on the guide 20.

To reduce the friction between the valve stem 31 and the guide 20, means is provided for continuously rotating the stem. This means comprises a pinion 71 meshing with the internal gear 43, and mounted on a shaft 72. The internal gear 43 is elongated to permit adjustment thereof with the stem 31 relative to the pinion 71. The shaft 72 is journaled in a bearing 73 which is formed in the lower wall of a gear housing 74, and which is fixed in the upper bracket plate 38. A worm wheel 75 is secured to the upper end of the shaft 72 in the housing 74, and meshes with a worm 76 on a shaft 77 adapted to be driven by any suitable power means (not shown). The internal gear 43 is adapted to serve as a container for lubricant.

Where the valve mechanism is subject to vibration, it is desirable to provide means to prevent the stem 31 from being affected thereby. In the present instance, we have provided a dash pot 78 mounted on the underside of the lower bracket plate 39. The valve stem section 31$^b$ extends slidably through the stud 55 into the dash pot 78, and carries a piston 79 on its end. A vent pipe 80 connects the ends of the dash pot 78, and the flow of air through said pipe may be adjusted by means of a needle valve 81 interposed therein. To limit the extent to which the valve members may move in the direction to close the valve ports, we provide a stop screw 82 in the lower head of the dash pot cylinder 78.

In Fig. 4 we have shown the invention as embodied in an overflow or relief valve which will maintain the inlet pressure constant, within very small limits, regardless of the rate of flow of the fluid through the valve, and regardless of gradual or sudden fluctuations in the rate of flow. Structurally the valve is similar to the one illustrated in Fig. 3, the difference being that the valve members are reversed so that the spring 52 tends to move them toward closed position. 83 are the valve members, 84 the valve ports, 85 the inlet pipe, 86 the outlet pipe, 87 the piston, and 88 the passage through which the piston is subjected to the pressure at the inlet side of the valve ports.

Under normal adjustment, the heads 57 on the lower ends of the rods 56 would engage the spring seat 53 before the valve members 83 could close the valve ports 84, but when it is desired to close the valve, the crank 66 may be operated to compress the spring until the valve members reach the closed position.

It will be evident that we have provided a novel and efficient valve for automatically maintaining a predetermined pressure at the inlet or outlet side, as the case may be. The valve is very sensitive, and is substantially unaffected by back pressure, friction or vibration.

We claim as our invention:—

1. A valve mechanism having, in combination, a valve casing formed with an inlet passage and a discharge passage, a valve sleeve connecting said passages through two alined end ports, a valve stem slidably disposed in said casing and having a pair of conical valve members centrally disposed in said valve ports, a piston attached to said valve stem, said valve stem and said piston being of equal diameters so as to neutralize the effect of any back pressure on said valve stem, an elongated guide member for said stem, spring means acting on said stem and tending to move the latter in a direction to close said ports, means for adjusting the pressure of said spring means, a passage formed in said casing for transmitting the pressure in one of the first mentioned passages to the inner end of said piston so as to balance said pressure against the pressure of said spring means, and means for rotating said stem.

2. A valve mechanism having, in combination, a support, a valve casing mounted on said support and comprising an inlet passage, a discharge passage and a valve passage, a valve member extending slidably through said valve passage and adapted upon axial movement to open or close the latter, the end of said valve member being exposed to the pressure in one of the first mentioned two passages, a spring seat and a gear mounted on said valve stem outside of said casing, a second spring seat adjustably mounted on said support, a coiled spring positioned on said stem and engaging said seats, means for adjusting said last mentioned seat axially of said stem to adjust the presure of said spring, and means for rotating said gear to continuously rotate said stem.

3. A valve mechanism having, in combination, a support, a dash-pot mounted on one end of said support, a guide member mounted on the other end of said support, a valve having a valve casing mounted on said guide member and having a valve stem extending therethrough, a shaft in said support, one end of said shaft being connected to the dash-pot piston, and the other end being connected to said stem, means for rotating said shaft, and spring means acting on said shaft and tending to actuate said stem in one direction.

4. A valve mechanism having in combination, a support, a dash-pot mounted on one end of said support, a tubular guide member having cooling ribs mounted on the other end of said support, a valve having a casing mounted on said guide member, and having a stem extending through said guide member, a shaft extending rotatably through said support, one end of said shaft being connected to the dash-pot piston, and the other end being connected to said stem, means for adjusting the action of said dash-pot, a spline gear and a spring seat secured against endwise movement on said shaft, said gear being keyed to said shaft and said spring seat being rotatable relatively thereto, means on said support for driving said gear in any axial position thereof to rotate said stem, a gear journaled in said support and rotatable about said shaft and having a screw threaded hub, a spring seat threaded onto said hub, means for adjusting said last mentioned gear, means coacting with said support to hold said spring seats against rotation relatively thereto, said last mentioned means having a sliding connection with one of said seats, and spring means disposed between said seats and tending to move said valve stem in one direction.

5. A valve mechanism having, in combination, a valve casing having an inlet passage, a discharge passage, a bore having three sections of increasing diameter, the outer sections communicating with one of said passages, a cylindrical valve sleeve removably secured in the intermediate section, said sleeve having end ports communicating respectively with the end sections and having a side port communicating with the other of said passages, the larger of said sections being closed by a removable guide member, a valve stem journalled in said guide member and having a pair of spaced valve members disposed respectively in said end ports, and means for adjusting said stem.

6. A valve mechanism having, in combination, a valve casing having an inlet passage, a discharge passage, a bore having three sections of increasing diameter, the outer sections communicating with one of said passages, a valve sleeve removably secured in the intermediate section, said sleeve having end ports communicating respectively with the end sections and having a side port communicating with the other of said passages, a valve stem journalled in said casing, and having a pair of spaced gradually tapering conical valve members disposed respectively in said end ports and extending therethrough in all positions of adjustment, and means for adjusting said stem.

7. A valve mechanism having, in combination, a support, a dash-pot mounted on one end of said support, said dash-pot comprising an exterior bleed line connecting the opposite ends of its cylinder, and a valve interposed in said line, a guide member mounted on the other end of said support, a valve having a valve casing mounted on said guide member and having a valve stem extending therethrough, a shaft in said support, one end of said shaft being connected to the dash-pot piston and the other end being connected to said stem, means for rotating said shaft, stationary spring means disposed about said shaft and tending to actuate the latter endwise in one direction, and means for adjusting said spring means, said last mentioned means being capable of adjustment during rotation of said shaft.

8. A valve mechanism comprising, in combination, an elongated casing, said casing being formed with a central longitudinal bore opening to one end, a parallel bore in the other end, spaced openings connecting the inner ends of said bores, an inlet passage opening to said first mentioned bore between said openings, a discharge passage opening to said second mentioned bore between said openings, and a passage opening from said inlet passage to the inner end of said first mentioned bore, a valve sleeve disposed in said first mentioned bore, said sleeve having a lateral port opening to said inlet passage and having aligned end ports opening to said first mentioned bore, a sleeve closing the outer end of said first mentioned bore, a valve stem extending through said sleeves into said last mentioned passage, and valve members on said stem extending through said end ports.

In testimony whereof we have hereunto affixed our signatures.

KARL A. MAYR.
RAYMOND E. WHITE.